United States Patent
Chatterjee et al.

(10) Patent No.: US 11,159,928 B2
(45) Date of Patent: Oct. 26, 2021

(54) SUPPORT OF SC-PTM BASED MULTICASTING FOR BL/CE AND NB-IOT UES

(71) Applicant: Apple Inc., Cupertino, CA (US)

(72) Inventors: Debdeep Chatterjee, San Jose, CA (US); Hyung-Nam Choi, Hamburg (DE); Marta Martinez Tarradell, Hillsboro, OR (US); Seau Lim, Swindon (GB); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/316,771

(22) PCT Filed: Aug. 11, 2017

(86) PCT No.: PCT/US2017/046581
§ 371 (c)(1),
(2) Date: Jan. 10, 2019

(87) PCT Pub. No.: WO2018/031928
PCT Pub. Date: Feb. 15, 2018

(65) Prior Publication Data
US 2019/0246254 A1 Aug. 8, 2019

Related U.S. Application Data

(60) Provisional application No. 62/374,632, filed on Aug. 12, 2016.

(51) Int. Cl.
*H04W 4/70* (2018.01)
*H04L 1/00* (2006.01)
(Continued)

(52) U.S. Cl.
CPC ............ *H04W 4/70* (2018.02); *H04L 1/0061* (2013.01); *H04L 1/0072* (2013.01);
(Continued)

(58) Field of Classification Search
CPC ............... H04W 72/042; H04W 48/12; H04W 72/1289; H04W 4/70; H04W 4/80;
(Continued)

(56) References Cited

U.S. PATENT DOCUMENTS

| 2019/0174529 A1* | 6/2019 | Tie ..................... H04W 72/1289 |
| 2019/0182633 A1* | 6/2019 | Wang .................... H04W 48/16 |
| 2019/0223197 A1* | 7/2019 | Shin ..................... H04L 1/0031 |

FOREIGN PATENT DOCUMENTS

WO 2012/110829 A1 8/2012

OTHER PUBLICATIONS

"SC-PTM further enhancements." Source: Huawei, HiSilicon. Agenda Item: 14.1.2. 3GPP TSG RAN Meeting #70, Sitges, Spain, Dec. 7-10, 2015. RP-151900. 10 pages.
(Continued)

*Primary Examiner* — Eric Myers
(74) *Attorney, Agent, or Firm* — Eschweiler & Potashnik, LLC

(57) ABSTRACT

Support of Single-Cell Point-To-Multipoint (SC-PTM) for narrowband (UEs) and low complexity (BL) UEs can is implemented at both the physical layers and the higher layers. For example, in one implementation, a UE may transmit, to a Single-Cell Point-To-Multipoint (SC-PTM) base station, multicast service preference information, including at least one of a Coverage Enhancement (CE) mode or a maximum Transport Block Size (TBS) of the UE. The UE may also monitor a common search space (CSS) of a MTC Physical Downlink Control Channel (MPDCCH) or Narrowband Physical Data Control Channel (NPDCCH) for
(Continued)

the scheduling of a Physical Downlink Shared Channel (PDSCH) or a Narrowband Physical Downlink Shared Channel (NPDSCH), respectively, to obtain downlink control information (DCI) that includes configuration information relating to a Single-Cell Multicast Control Channel (SC-MCCH).

25 Claims, 8 Drawing Sheets

(51) Int. Cl.

| | | |
|---|---|---|
| *H04L 5/00* | (2006.01) | |
| *H04W 4/80* | (2018.01) | |
| *H04W 76/11* | (2018.01) | |
| *H04W 24/08* | (2009.01) | |
| *H04W 72/04* | (2009.01) | |

(52) U.S. Cl.
CPC .......... *H04L 5/0053* (2013.01); *H04L 5/0091* (2013.01); *H04W 4/80* (2018.02); *H04W 24/08* (2013.01); *H04W 72/042* (2013.01); *H04W 72/0446* (2013.01); *H04W 72/0453* (2013.01); *H04W 72/0466* (2013.01); *H04W 76/11* (2018.02); *H04L 1/0046* (2013.01); *H04L 5/001* (2013.01)

(58) Field of Classification Search
CPC . H04W 76/11; H04W 24/08; H04W 72/0446; H04W 72/0453; H04W 72/0466; H04L 1/0072; H04L 5/0053; H04L 5/0091; H04L 1/0046; H04L 5/001
See application file for complete search history.

(56) References Cited

OTHER PUBLICATIONS

"Summary of email discussion: [91#22][LTE/SC-PTM] Scheduling pattern, DRX and Change Notification." Source: Huawei (Rapporteur). Agenda Item: 7.3.2. 3GPP TSG-RAN WG2 #91bis, Malmo, Sweden, Oct. 5-9, 2015. R2-154195. 10 pages.

"FDD-TDD differentiation for SC-PTM capabilities." Source: Huawei, HiSilicon. Agenda Item: 7.3. 3GPP TSG RAN WG2 Meeting #93bis, Dubrovnik, Croatia, Apr. 11-15, 2016. R2-162270. 2 pages.

"On multicast support for Cat M1 UEs." Source: Intel Corporation. Agenda Item: 7.2.10.2. 3GPP TSG RAN WG1 Meeting #86, Gothenburg, Sweden, Aug. 22-26, 2016. R1-166537. 3 pages.

"SC-PTM support for eNB-IoT." Source: Intel Corporation. Agenda Item: 6.2.9.2. 3GPP TSG RAN WG1 Meeting #87, Reno, USA Nov. 14-18, 2016. R1-1611941. 5 pages.

International Search Report and Written Opinion dated Jan. 18, 2018 for PCT Application PCT/US2017/046581.

* cited by examiner

SUPPORT OF SC-PTM BASED MULTICASTING FOR BL/CE AND NB-IOT UES

RELATED APPLICATIONS

This application is a National Phase entry application of International Patent Application No. PCT/US2017/046581 filed Aug. 11, 2017, which claims priority to U.S. Provisional Patent Application No. 62/374,632, which was filed on Aug. 12, 2016, and is hereby incorporated by reference in its entirety.

BACKGROUND

Single-Cell Point-To-Multipoint (SC-PTM) refers to multipoint transmission in cellular networks that is complimentary to Evolved Multimedia Broadcast Multicast Services (eMBMS) transmission. SC-PTM may reuse the eMBMS system architectures (logical entities and interfaces) to perform PTM transmissions. However, the synchronized multi-eNB transmission of eMBMS is abandoned, i.e., PTM transmission are performed on a per-cell basis.

Optimized support of a massive number of Cellular Internet of Things (CIoT) or Machine-Type Communications (MTC) devices that have very low device complexity, are latency-tolerant, and require low throughput and very low power consumption, is seen as a key ingredient for next-generation cellular wireless networks. These low complexity MTC devices may be referred to as Bandwidth Reduced Low Complexity User Equipment (referred to as BR UEs or BL UEs herein). Such designs of CIoT systems can be based on an evolution of Third Generation Partnership Project (3GPP) Long Term Evolution-Advanced (LTE-Advanced) features, such as support for low complexity MTC devices. BR UEs may need to support a bandwidth of 1.4 Megahertz (MHz) on the downlink (DL) and uplink (UL) at both radio frequency (RF) and baseband irrespective of the system bandwidth.

CIoT devices can also be supported in so-called Narrow-Band (NB)-IoT systems where these devices may only need to support up to 180 kHz bandwidth for both downlink and uplink at both RF and baseband stages. NB-IoT systems with a minimum of 180 kHz system bandwidth can be deployed on Global System for Mobile communication (GSM) bands or on LTE guard bands or within larger LTE system bandwidths (i.e. inband occupying only 1 LTE Physical Resource Block (PRB)).

Support for BL/NB devices in SC-PTM environments may be desirable in a number of use cases. For example, broadcasting software updates to a large number of BR/NB CIoT devices may provide for efficient use of the cellular radio interface.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Techniques described herein relate to support of SC-PTM for BL, Coverage Enhancement (CE), and NB UEs. BL, CE, and NB UEs do not use the LTE wideband Physical Data Control Channel (PDCCH). Instead, BL and CE UEs may use the MTC Physical Downlink Control Channel (MPDCCH) and NB UEs may use the Narrowband PDCCH (NPDCCH). In particular, the techniques described herein relate to enabling the use of MPDCCH and NPDCCH in an SC-PTM environment. For simplicity, in the description herein, the techniques described for BL and/or NB UEs may be similarly applicable to CE UEs.

Figure 1:
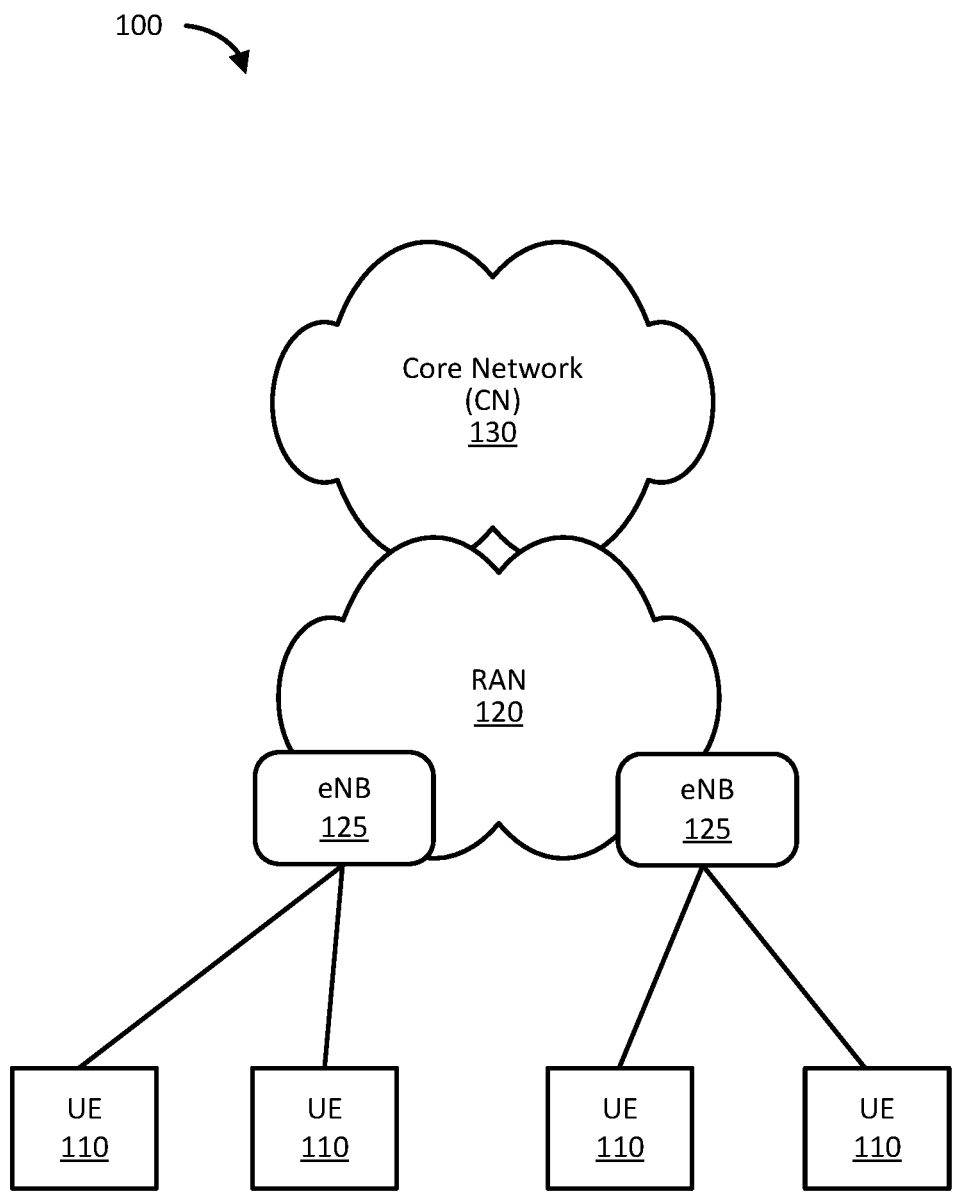
FIG. 1 is a diagram of an example system in which systems and/or methods described herein may be implemented.

FIG. 1 is a diagram of an example system 100 in which systems and/or methods described herein may be implemented. As shown, system 100 may include a telecommunication network that includes a Radio Access Network (RAN) 120 that is connected to a Core Network (CN) 130. RAN 120 and CN 130 may provide network connectivity to UEs 110. RAN 120 may include, for example, one or more 3rd Generation Partnership Project (3GPP) base stations 125, such Long Term Evolution (LTE) evolved NodeBs (eNBs) and/or one or more 3GPP eNBs. Base stations 125 may be generically referred to as eNBs 125 herein.

In some implementations, CN 130 may include multiple CNs, such as a 4G CN (e.g., an Evolved Packet Core (EPC)), a 5G CN (e.g., a CN capable of supporting 5G technologies), an Internet-of-Things (IoT) CN (e.g., a CN dedicated to supporting IoT devices), etc. In some implementations, telecommunication network 100 may include a single CN that is capable of supporting 4G, 5G, and IoT services.

UEs 110 may each include a portable computing and communication device, such as a personal digital assistant (PDA), a smartphone, a cellular phone, a laptop computer with connectivity to the wireless telecommunications network, a tablet computer, etc. UE 110 may also include a computing and communication device that may be worn by a user (also referred to as a wearable device) such as a watch, a fitness band, a necklace, glasses, an eyeglass, a ring, a belt, a headset, or another type of wearable device. As particularly described herein, UEs 110 may include NB-IoT UEs or bandwidth reduced low complexity (BR or BL) UEs.

eNBs 125 may include one or more network devices that receive, processes, and/or transmit traffic destined for and/or received from UE 110 via an air (radio) interface. eNBs 125 may function as an intermediary for information communicated between eNBs 125 and CNs 130. eNBs 125 may implement, for example, 4G or 5G technologies for connecting and providing services to UEs 110. Such connections may utilize 4G or 5G radio resources as defined by the 3GPP Communications Standards.

In implementations described herein, eNBs 125 may particularly implement SC-PTM to provide broadcast/multicast services over a single cell in which the broadcast/multicast area can be dynamically adjusted cell by cell according to user distribution. SC-PTM may use the Evolved Multimedia Broadcast Multicast Services (eMBMS) system architecture. SC-PTM transfers the broadcast/multicast services using the Long Term Evolution (LTE) downlink shared channel and it is scheduled using a common Radio Network Temporary Identifier (RNTI) (i.e. group-RNTI) for a group of users.

Different techniques, described herein, relating to the providing of multicast services via SC-PTM for BR and NB UEs may be performed at the physical layer and at higher layers. Higher layer techniques will first be described with reference to FIG. 3. Physical layer techniques will be described with reference to FIG. 4.

Coverage Enhancement (CE) techniques are defined in the 3GPP specifications to extend the coverage area of an eNodeB, potentially at the cost of decreased data rate. Two CE modes, CE mode A and CE mode B are particularly defined. UEs 110 may support one or both modes.

Figure 2:
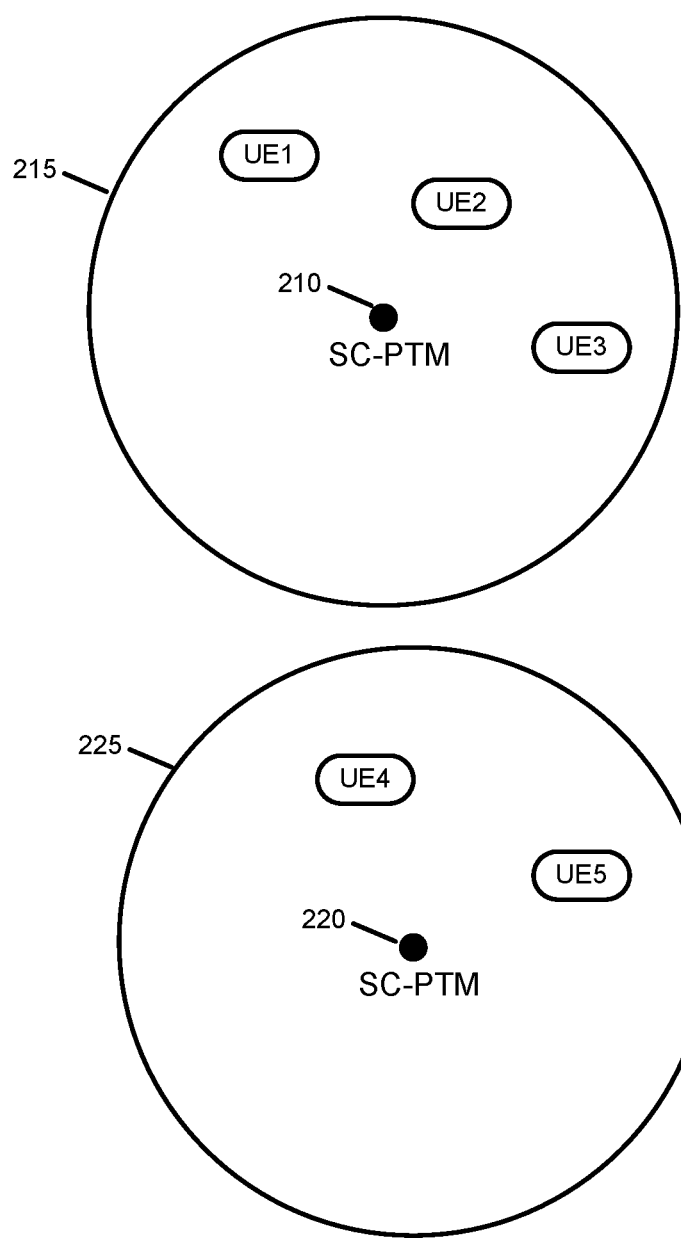
FIG. 2 is a diagram conceptually illustrating bandwidth reduced/narrowband regions that may be provided by SC-PTMs.

FIG. 2 is a diagram conceptually illustrating BR/NB regions that may be provided by SC-PTMs. As shown, a first SC-PTM 210 may provide radio coverage for a first multicast region 215 (i.e., a multicast cell), and a second SC-PTM 220 may provide radio coverage for a second multicast region 225. UEs, labeled UE1, UE2, and UE3 may be in the coverage area of first multicast region 215 and UE4 and UE5 may be in the coverage area of second multicast region 225. UE1 through UE5 may be BR/NB UEs. Different multicast services may be enabled for different multicast regions an/or to different UEs. For example, the particular multicast service may be associated with a particular content stream and may be broadcast using a particular set of multicast parameters. The multicast parameters may include, for example, the CE mode (A or B), coverage levels, etc.

Figure 3:
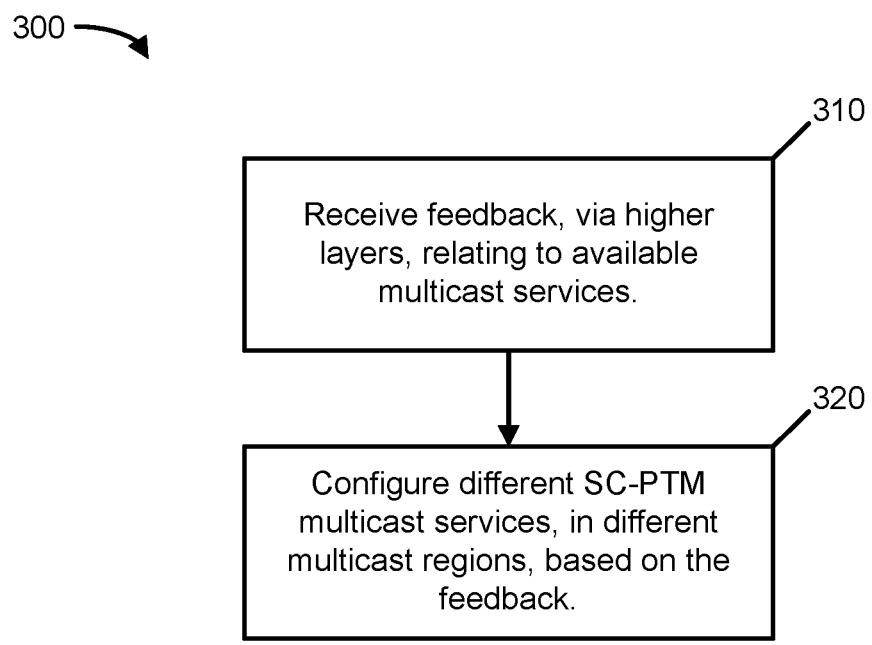
FIG. 3 is a flowchart illustrating an example process relating to configuring SC-PTM or multicast services.

FIG. 3 is a flowchart illustrating an example process 300 relating to configuring SC-PTM or multicast services. Process 300 may be performed by, for example, UE 110.

Process 300 may include receiving feedback, via higher layers (i.e., non-physical layers), relating to available multicast services (block 310). For example, SC-PTM 210 may transmit, either via multicast transmission or via unicast transmission (such as from a standard eNodeB), information describing the scheduled transmissions in a particular multicast region, multicast parameters associated with the multicast region, or other information. Alternatively or additionally, UEs may transmit, using higher layer signaling, the CE modes supported by the UE, identification information of the UE, information relating to the coverage level desired by the UE, multicast services or channels in which the UE is interested, or other information relating to reception of SC-PTM multicast transmissions.

In one implementation, the information transmitted/received in block 310 may be performed using a 3GPP message (e.g., an MBMSInterestIndication message) that may be transmitted as a Radio Resource Control (RRC) message, Non-Access Stratum Packet Data Unit (NAS PDU) message, or MAC CE. As mentioned, the message may include, for example, the CE mode supported by or desired by a UE, whether Frequency Hopping/Multi-carrier Operation (FH/MCO) is enabled, or information relating to the Transport Block Size (TBS).

Process 300 may further include configuring SC-PTM multicast services, in different multicast regions, based on the feedback (block 320). The multicast services may be enabled to optimize the multicast services for the UEs that are in the particular multicast regions. For example, if all the UEs in multicast region 215 support a particular CE mode or are requesting a particular multicast channel, SC-PTM 210 may be configured accordingly.

In one implementation, the configuration of the SC-PTM multicast services may include enabling SC-PTM reception for UEs using coverage enhancement with different coverage levels. For example, SC-PTM may be used with UEs that are operating in both CE mode A and CE mode B.

In another implementation, the configuration of the SC-PTM multicast services may include enabling SC-PTM for UEs operating with frequency hopping (FH) enabled. Here, frequency hopping may be defined as operating in different bandwidth reduced channels (e.g., 1.4 MHz channels) or extended bandwidth reduced channels within the whole LTE bandwidth.

In another implementation, the configuration of the SC-PTM multicast services may include enabling SC-PTM multicast on a per-bandwidth reduced channel basis or per-extended bandwidth reduced channel basis, within the whole LTE bandwidth. Alternatively, SC-PTM multicast may be implemented using Narrowband carriers.

System Information Blocks (SIBs) may be used in 3GPP systems to carry system information (SI) for the UE to assist the UE in accessing a cell. In Release 13 of the 3GPP standard, SIB15 (SIB Type 15) and SIB20 (SIB Type 20) carry multicast related information needed to start the acquisition of the SC control channel (SC-Multicast Control Channel (MCCH)) and the SC traffic channel (SC-Multicast Traffic Channel (MTC)). In some situations, UEs may be unable to receive the SIB messages. Accordingly, in some implementations, important information contained within the SIBs may also be transmitted using dedicated signaling that is implemented with a UE or group of UEs.

In some implementations, connected mode UEs may stop monitoring downlink unicast transmissions and instead monitor downlink broadcast transmissions. The monitoring of the downlink broadcast transmissions may be performed for a certain time period, and after that time period, the UE may still be considered to be in connected mode without having to be released to idle mode in order to acquire the system information. Alternatively, the UE may receive broadcast and unicast data in an interleaved manner.

In single-cell multicast transmission, the Single-Cell Multicast Control Channel (SC-MCCH) may be associated with a "modification period" in which changes in the MCCH may be indicated. As will be explained below, the definition of the modification period boundaries may be updated to accommodate longer times required for BR and NB UEs due to additional transmission repetitions. Accordingly, in some implementations, the Hyper System Frame Number (H-SFN) may be used instead of or in addition to the System Frame Number (SFN).

Changes may additionally be implemented relating to the SC-MCCH configuration, SC-MCCH modification period, and SC-MTCH configuration. The changes may include: (1) longer periods or timers defined due to CE or coverage levels, that can be defined as new values or based on a proportional factor that applies to the currently specified values; (2) communication of information describing when a UE can start combining a specific message or information sent in a physical channel (e.g. MPDCCH or NPDCCH), particularly if any SC-PTM related transmissions are carried directly on the Physical Downlink Shared Channel (PDSCH) (for BL/CE UEs) or Narrowband Physical Downlink Shared Channel (NPDSCH) (for NB-IoT UEs) without dynamic control based on MPDCCH or NPDCCH; and/or (3) communication of information describing when a new transmission of a transport blocks starts and ends (if the transport blocks occupies multiple TTIs) if any SC-PTM related transmissions are carried directly on the PDSCH (for BL/CE UEs) or NPDSCH (for NB-IoT UEs) without dynamic control based on MPDCCH or NPDCCH.

The allowable TBS range may need to be restricted due to the limitations associated with MTC/IoT UEs, e.g., category M1 UEs, NB-IoT UEs, and/or UEs supporting CE. The allowable TBS range may be transmitted to the UEs, such as via a new information element that includes the range. In some implementations, the allowable TBS range may be communicated to the UE along with other information, such as information indicating the number of subframes that may be occupied.

Packet Data Convergence Protocol (PDCP) may not be used for SC-PTM communications. For example, a signaling radio bearer, SRB1bis is defined for NB-IoT that uses the configuration of the SRB signaling radio bearer but without the PDCP. A similar signaling radio bearer may be used for SC-PTM communications.

Physical layer techniques relating to the providing of multicast services via SC-PTM for BR and NB UEs will next be described with reference to FIG. 4.

As previously mentioned, the SC-MCCH may be the control channel for SC-PTM transmissions. The SC-MCCH may be configured via fields in the 3GPP SIB20 message. Consistent with implementations described herein, a number of the fields in the SIB20 data 3GPP data structure in the existing 3GPP standards may be altered or removed in the context of SC-PTM. These fields will next be described:

sc-mcch-ModificationPeriod. The sc-mcch-Modification-Period may be increased to accommodate time domain repetitions and cross-subframe scheduling for MPDCCH/NPDCCH.

sc-mcch-duration. The sc-mcch-duration field may be used to indicate the maximum number of repetitions used to transmit the MPDCCH/NPDCCH. Alternatively or additionally, the sc-mcch-duration field may be removed since MPDCCH/NPDCCH may be transmitted with a number of according to the search space configuration and the number of repetitions for the PDSCH/NPDSCH may be indicated by the downlink assignment associated with the downlink control information (DCI).

sc-mcch-Offset. The offset range in this field may be extended to use a longer range of values for the sc-mcch-RepetitionPeriod.

sc-mcch-FirstSubframe. This field may be used to indicate the starting subframe for the MPDCCH/NPDCCH common search space (CSS), which is referred to as Type3-CSS for MPDCCH/NPDCCH herein. Alternatively or additionally, this field may indicate the starting subframe for the PDSCH/NPDSCH transmission carrying the SC-MCCH information without dynamic scheduling via MPDCCH/NPDCCH.

sc-mcch-RepetitionPeriod: This field may define the interval between transmissions of SC-MCCH information (in radio frames). In one embodiment, the range of this field may be increased by increasing only the upper bound. Alternatively or additionally, both the lower bound and upper bound of the range of this field may be increased.

Given the broadcast nature of SC-PTM transmissions, the scheduling of the downlink control channel (i.e., the SC-MCCH) may be performed using MPDCCH/NPDCCH in a common search space (CSS) that all or a group of UEs within a multicast region (cell) may monitor. This will be referred to herein as Type3-CSS for MPDCCH/NPDCCH.

Figure 4:
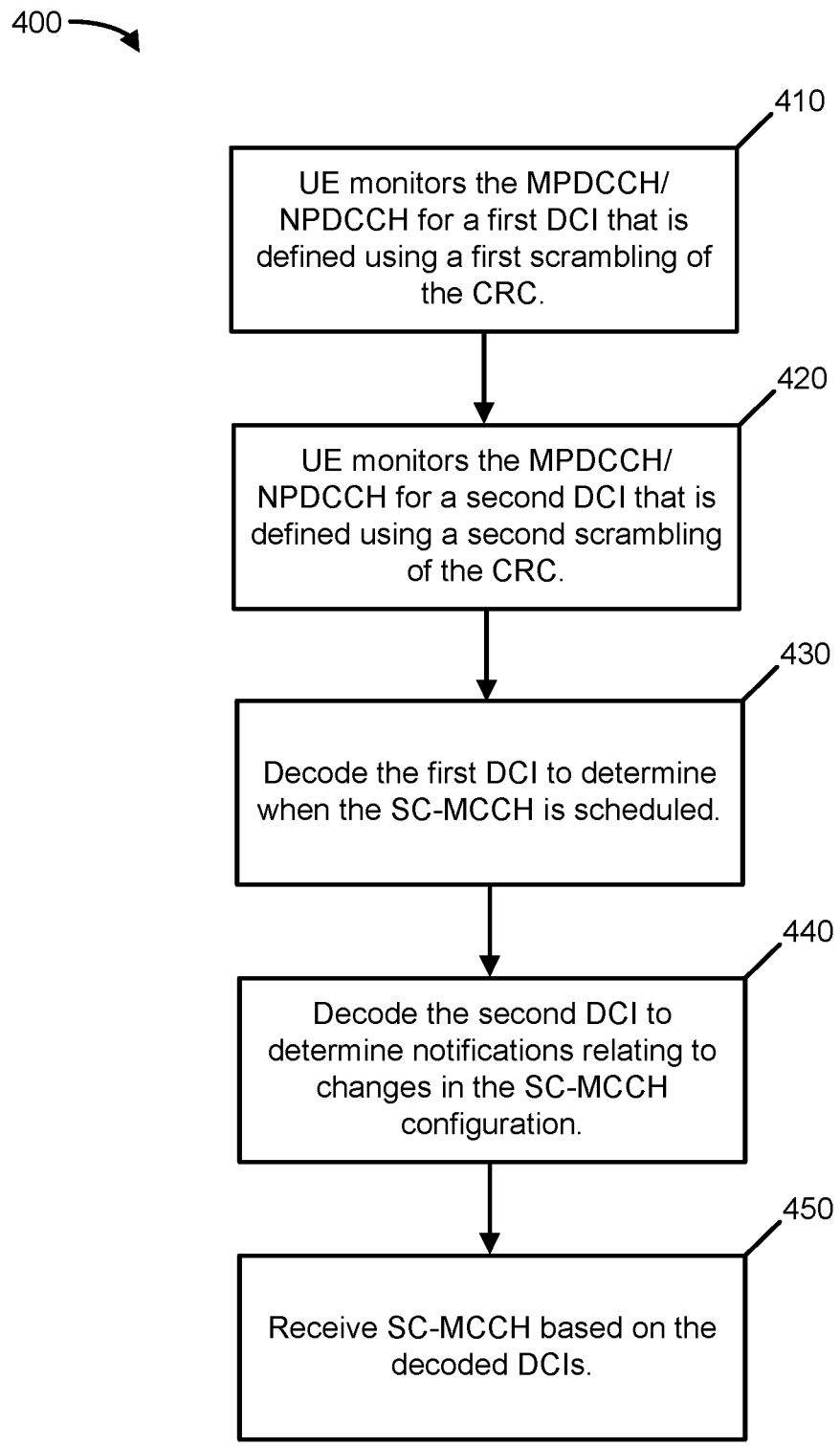
FIG. 4 is a flowchart illustrating an example process for scheduling the SC-MCCH.

FIG. 4 is a flowchart illustrating an example process 400 for scheduling the SC-MCCH.

Process 400 may include monitoring, by the UE, the MPDCCH/NPDCCH for a first DCI that is defined using a first scrambling of the cyclic redundancy check (CRC) (block 410). The CRC portion of a radio channel message may be scrambled, such as based on the Radio Network Temporary Identifier (RNTI). In one implementation, the scrambling for the first DCI may be based on the SC-RNTI or the SC-N-RNTI. The DCI format may be DCI format 6-1A, 61-B, or 6-2 for BL/CE UEs, and DCI format N1 or N2 for NBIoT UEs. In some implementations, it may it may be beneficial and/or efficient to use the DCI formats 6-2 and N2 for BL/CE and NBIoT UEs, respectively, due to the corresponding reduced sizes. Due to the broadcast nature of the transmissions, and the need to support UEs in both connected as well as idle modes, the eNodeB may transmit the SC-MCC to target the worst coverage in the cell—similar to the transmission of paging related DCI or paging messages. It may be desirable to minimize the DCI size to minimize the number of MDPCCH/NPDCCH repetitions that need to be used.

Process 400 may further include monitoring, by the UE, the MPDCCH/NPDCCH for a second DCI that is defined using a second scrambling of the CRC (block 420). In practice, the operations of blocks 410 and 420 may be performed concurrently. The DCI size of the first and second DCI may be the same. The scrambling of the second DCI may be different than that of the first DCI, so if the SC-RNTI is used for the first DCI, SC-N-RNTI may be used for the second (or reversed).

Process 400 may further include decoding the first DCI to determine when the SC-MCCH is scheduled (block 430). The second DCI may be decoded to determine notifications relating to the SC-MCCH content (e.g., the information conveyed by the SC-MCCH) (block 440). Based on this information, the SC-MCCH may be received and decoded by the UE (block 450).

In a potential variation on the embodiment discussed with respect to FIG. 4, the UE may monitor the Type3-CSS for MPDCCH/NPDCCH for two instances of DCI format 6-2 (for BL/CE UEs) or DCI format N2 (for NBIoT UEs), such that a first one of the two instances is scrambled with SC-RNTI, and the second one of the two instances is scrambled with SC-N-RNTI. The first one of the two instances may have a flag value set to 1 and the second of the two instances may have the flag value set to zero. Here, the flag value refers to the field used for paging or direct indication differentiation. The DCI format 6-2 (or N2) (with flag=1) and scrambled with SC-RNTI may provide scheduling information for the PDSCH/NPDSCH carrying SC-MCCH. On the other hand, the DCI format 6-2 (or N2) (with flag=0) and scrambled with SC-N-RNTI carries a length-8 bitmap, wherein the least significant bit (LSB) (or any other specified bit position) indicates the notification of SC-MCCH content change.

In some situations, transmitting and monitoring for two DCI formats can incur additional system overhead as well as increased UE power consumption. To alleviate this issue, in another implementation, a single DCI may be transmitted with CRC scrambled by SC-RNTI only, and additionally, one or more bits in the DCI format may be used to indicate the occurrence of a change in the SC-MCCH information. In case of multiple bits, the field can be represented by a bitmap of a certain length, L, wherein a particular bit position p (within the L bits of the bitmap) indicates the notification of SC-MCCH content change.

Further, in another implementation, a new field may be defined to add one or more bits to the DCI format. Alternatively, an existing field may be reinterpreted. As an example, DCI format 6-2 can be reused for this purpose by reinterpreting the 1-bit flag field (field used for paging or direct indication differentiation) to indicate a notification of a change, while other fields can indicate resource allocation information for the PDSCH. For NB-IoT systems, DCI format N2 can be reused for this purpose by reinterpreting the 1-bit flag field (field used for paging or direct indication differentiation) to indicate a change notification, while the rest of the fields can indicate resource allocation information for the NPDSCH. Similarly, for DCI formats 6-1A, 6-1B or N1, some of the fields can be reinterpreted. Some examples include the new data indicator (NDI) bit, HARQ-ACK resource indication in DCI format N1; the NDI bit and HARQ-ACK resource offset in DCI formats 6-1A and 6-1B. These fields can be reinterpreted to convey SC-MCCH information change notification when the CRC of the MPDCCH/NPDCCH is scrambled by SC-RNTI.

As previously mentioned, the SC-MTCH may be the traffic channel for SC-PTM transmissions. The SC-MTCH may be carried by the PDSCH/NPDSCH that is scheduled by MPDCCH/NPDCCH. Similar to SC-MCCH scheduling, due to the broadcast nature of the transmission, a common search space for MPDCCH/NPDCCH may be necessary for the scheduling of the PDSCH/NPDSCH carrying the SC-MTCH information. This instance of the CSS will be referred to herein as Type4-CSS for MPDCCH/NPDCCH.

For BL/CE UEs, the DCI format used to schedule the PDSCH can be either DCI format 6-2 or, alternatively, DCI format 6-1B. Similarly, for NB-IoT UEs, the DCI format used to schedule the NPDSCH can be either DCI format N2 or, alternatively, DCI format N1.

Techniques relating to the implementation of the Type3-CSS for MPDCCH/NPDCCH and Type4-CSS for MPDCCH/NPDCCH will next be described.

In general, the design of the Type3-CSS for MPDCCH/NPDCCH may be generally related to the existing design of Type1-CSS for MPDCCH/NPDCCH that is used to schedule paging records or carry direction indication of system information updates for BL/CE and NB-IoT UEs, respectively. In one embodiment, the configuration of the Type3-CSS for MPDCCH/NPDCCH may be provided via SIB signaling (i.e., using MTC-SIBs or NB-SIBs). For MPDCCH, in order to support worst coverage level in the cell, the aggregation level (AL) of the MPDCCH in Type3-CSS may be fixed at 24 with a Physical Resource Block (PRB) set of 2+4. Similarly, for NPDCCH, AL of NPDCCH in Type3CSS is always 2. Further, for MPDCCH, only distributed MPDCCH may be supported for Type3CSS.

In one implementation, the starting subframe for Type3-CSS for MPDCCH/NPDCCH may be indicated by the starting subframe as indicted in the SIB20 message. In the SIB20 message, the fields sc-mcch-FirstSubframe, sc-mcch-RepetitionPeriod, and sc-mcch-Offset may be used to indicate the starting subframe. Further, within the Type3-CSS, the starting subframe for all MPDCCH/NPDCCH candidates for all repetition levels (RLs) may be aligned with the starting subframe of the Type3-CSS.

With respect to narrowband or carrier location, in one implementation, for Type3-CSS for MPDCCH, the narrowband index, corresponding to the starting subframe of the Type3-CSS, may be configured via MTC-SIB signaling. For NB-IoT, the Type3-CSS for NPDCCH and all SC-PTM related transmissions may be restricted to the anchor carrier (i.e., the NB-IoT carrier with Narrowband Primary Synchronization Signal (NPSS)/Narrowband Secondary Synchronization Signal (NSSS)/Narrowband Physical Broadcast Signal (NPBCH) and NSIB transmissions).

In some implementations, multicarrier operation (MCO) may be supported for Type3-CSS and SC-PTM transmissions. However, all transmissions related to SC-PTM, including Type3-CSS, Type4-CSS, and the associated SC-MTCH on NPDSCH, may be transmitted in the same carrier in order to avoid additional retuning efforts by NB-IoT UEs for SC-PTM reception. Alternatively, for both BL/CE UEs and NB-IoT UEs, Type4-CSS and possibly also the associated SC-MTCH on PDSCH/NDPDSCH may be transmitted on a different or the same narrowband/carrier, and the carrier information may be indicated to the UE as part of configuration of Type4-CSS via SIB signaling or as part of SC-MCCH information.

With respect to frequency hopping, for BL/CE UEs, the application of frequency hopping (FH) for the MPDCCH in Type3-CSS and the associated PDSCH may be configured (ON/OFF) via a single common parameter indicated as part of the MTC-SIB signaling. Alternatively or additionally, the frequency hopping for the MPDCCH and PDSCH may be configured separately via MTC-SIB signaling.

The maximum number of repetitions for Type3-CSS can be indicated as part of the Type3-CSS configuration in a cell-specific manner using SIB signaling. It can also be indicated using the sc-mcch-duration field as part of the SC-MCCH configuration in SIB20.

With respect to Type4-CSS for MPDCCH/NPDCCH, the configuration of Type4-CSS can be very similar to that for Type3-CSS with possibly different narrowbands or carriers and different configuration of the starting subframes of the search space and candidates within the search space. Specifically, the starting subframe configuration for Type4-CSS may be provided via cell-specific SIB signaling similar to the configuration of Type2-CSS (for random access procedure).

With respect to the overall configuration of Type3-Css and Type4-CSS, the Type3-CSS and Type4-CSS may share the same configuration, with the exception of the narrowband/carrier used and the starting subframe configuration. Accordingly, the configuration signaling from higher layers for the common parameters may be performed jointly and only the different ones indicated separately. To provide additional flexibility, at least part of the configuration including one or more of the configuration of frequency hopping, narrowband/carrier used, starting subframes for the search space for Type4-CSS for MPDCCH/NPDCCH may be indicated as part of the SC-MCCH scheduled by MPDCCH/NPDCCH in Type3-CSS.

For the support of SC-PTM in both RRC idle and connected modes, BL/CE UEs and NB-IoT UEs may need to monitor Type3-CSS and Type4-CSS in both RRC idle and connected modes. As a consequence, there may be instances of time domain conflicts between monitoring Type3-CSS or Type4-CSS or the associated PDSCH/NPDSCH carrying SC-MCCH and SC-MTCH content, respectively, with other search spaces and downlink channels that the UE may be expected to monitor or receive.

Time domain conflicts/collisions in RRC Idle mode may include:
  Conflicts with Type1-CSS and paging PDSCH in different narrowband/carrier. In one implementation, paging DCI monitoring and paging record reception may be prioritized over SC-PTM in order to mitigate this conflict.
  Conflicts with Type2-CSS and PDSCH/PUSCH (collisions of PUSCH is relevant for HD-FDD UEs) related to random access procedure with different narrowband/carrier. In one implementation, MPDCCH/NPDCCH and PDSCH/PUSCH related to random access procedure may be prioritized over monitoring or reception of SC-PTM information in order to mitigate this conflict.
  Conflicts with MTC-SI/NB-SI messages in same or different narrowband/carrier. In this case, according to one embodiment, the UE may assume that the system information (SI) is transmitted and the SC-PTM related transmissions in the collided subframes are either postponed or dropped. However, if the SI message transmission and SC-PTM related transmissions occur on different narrowbands or carriers, then, unless the UE has detected SI updated notification, it can prioritize monitoring and reception of SC-PTM rather than SI message(s).

Time domain conflicts/collisions in RRC Connected mode may include:
  Conflicts with USS and PDSCH/NPDSCH in the different carrier/narrowband. In this case, the UE capable of supporting and interested in the MBMS service can prioritize SC-PTM related control or data reception instead of monitoring USS. However, for the case of conflicts with PDSCH/NPDSCH, the UE may prioritize the scheduled unicast PDSCH/NPDSCH over SC-PTM.
  Conflicts with Type0-CSS in different carrier/narrowband: Type0-CSS may be supported by BL/CE UEs in CE mode A. In case of conflicts in different carriers/narrowbands, the UE may prioritize SC-PTM over Type0-CSS monitoring.

For conflicts between Type3-CSS and Type4-CSS, in this case, given that the configuration information is carried by the SC-MCCH and may have been updated, in one implementation, the UE may assume that Type3-CSS is transmitted (in case of conflicts in the same carrier/narrowband) or prioritizes monitoring of Type3-CSS over Type4-CSS (in case of conflicts in different carrier/narrowband).

The above description may generally be applicable for any system that is designed to operate in reduced bandwidth (reduced BW) or narrowband (NB) regions, such as, reduced to 1.4 MHz or 200/180 kHz. The system may only operate in a single reduced BW or NB, as well as, in multiple ones. Alternatively, the system might also operate in a larger BW, e.g., 3GPP Release 13 LC UE may only support reduced BW or NB (e.g. 1.4 MHz or 200 kHz), however the network could operate in a larger system BW (e.g. 10 MHz or 20 MHz).

Further, the system described above uses terminology of low complexity (LC) UEs operating in reduced BW or NB, however, the concepts disclosed herein can also be applicable to any other UE working in reduced BW, such as category M, category 0, C-IoT UE, NB-UE, as well as, for any UE that might use enhanced coverage (EC) mode/technique or for any other UE that could benefit from the mechanisms described herein. Moreover this disclosure explains the changes or new procedures required to enable multicast services for devices operating in bandwidth reduced (BR) or narrowband operation (NB), for any existing or new categories that might also be defined within 3GPP Release-14, 5G and future BR or NB operations. For simplicity, this is referred to as BR/NB operation or MTC/NB-IoT.

The terminology (e)PDCCH, MPDCCH or NPDCCH is used herein to refer to the control channel. For simplicity, one of the terms might only used.

For simplicity, the terminology used herein refers to LTE terminology but this should not be understood as restricting the use of other technologies or other systems. Different terminology might be used. For example, GSM, UMTS, NB-IoT, 5G, NR (New RAT), Next Generation (NextGen), etc. The term frequency hopping (FH) could be defined as (a) operating in different BR(s) or extended-BR(s) within the whole system LTE BW, or (b) operating in different NB carriers over time. It can also be used in relation to multi-carrier operation (MCO), however, MCO might only mean that a UE might be configured or be operating for a given time on different carriers without having FH enabled; alternatively MCO and FH could also be assumed together.

References to NB carrier or NB-IoT carrier may refer to any carrier (e.g. in stand-alone, in-band or guard band w/in LTE deployments) as well as anchor or non-anchor fashion. For the channels described herein, updated parameters might use slightly different names/terms to differentiate them from legacy 3GPP Release 13 names/terms or wideband operational SC-PTM (e.g., NB or N when referring to changes specific to NB-IoT operation, and BR or M when referring to eMTC operation).

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software.

Figure 5:
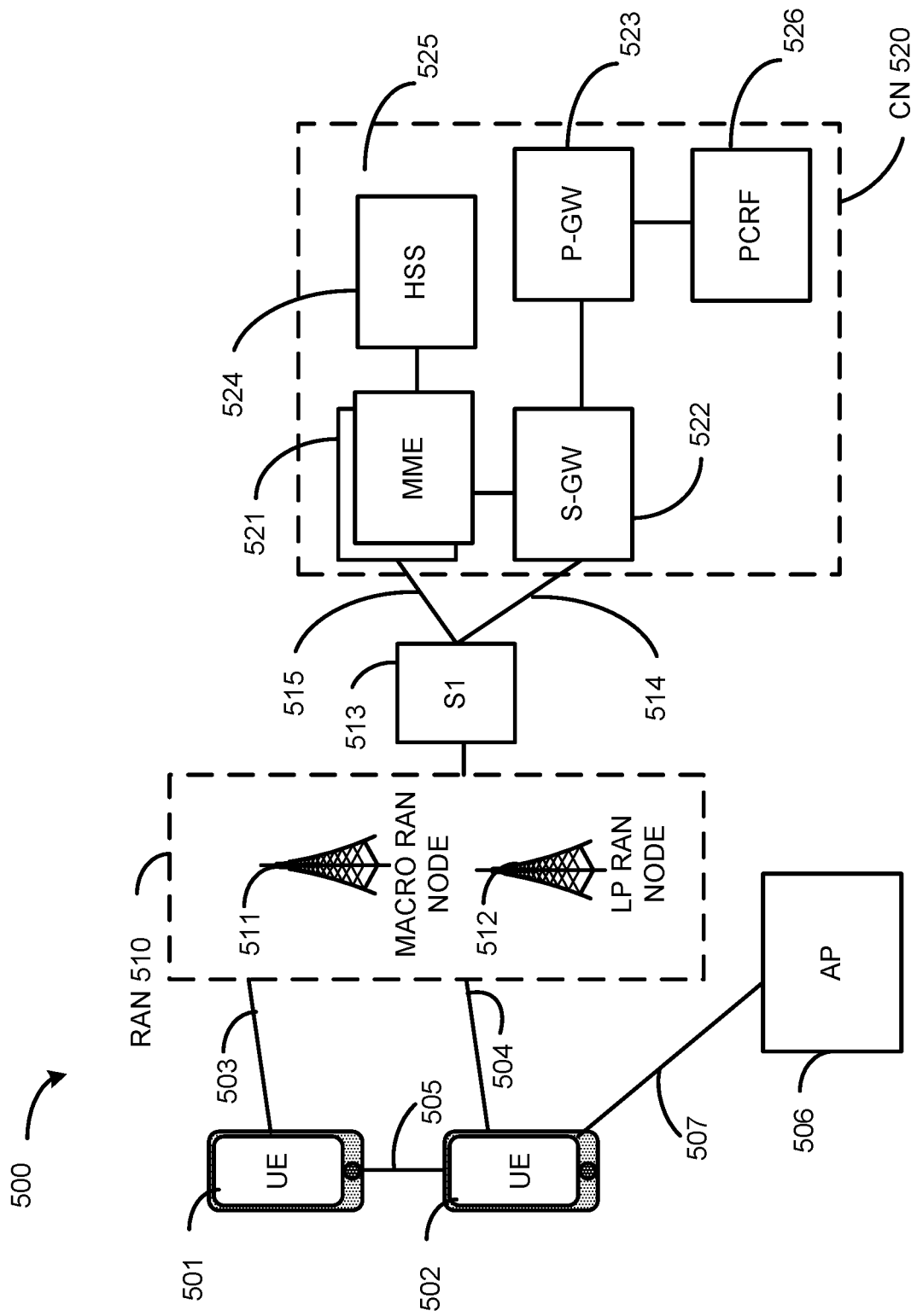
FIG. 5 illustrates an architecture of a system of a network in accordance with some embodiments.

FIG. 5 illustrates an architecture of a system 500 of a network in accordance with some embodiments. System 500 may represent a complimentary view of environment 100. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
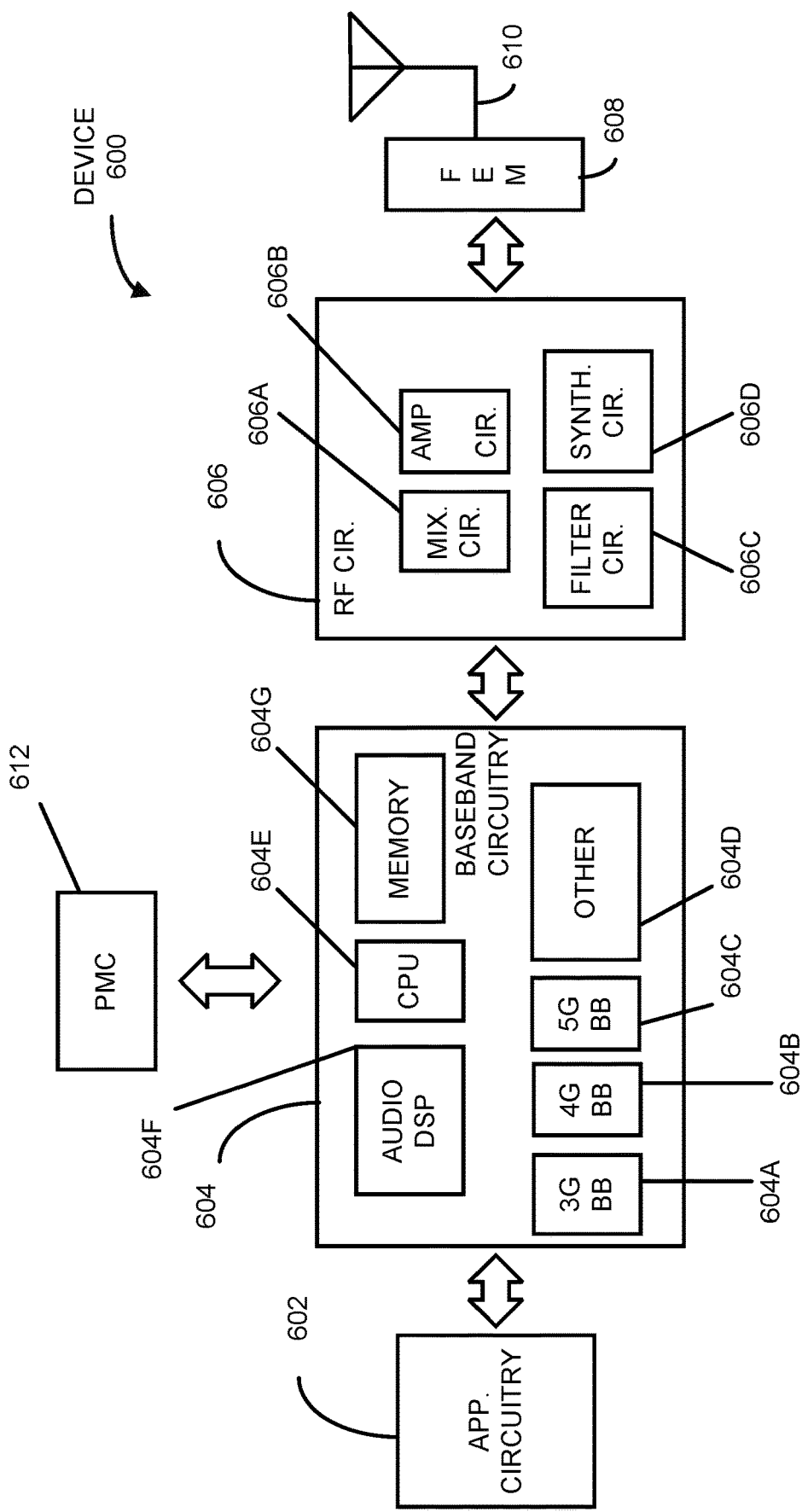
FIG. 6 illustrates example components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
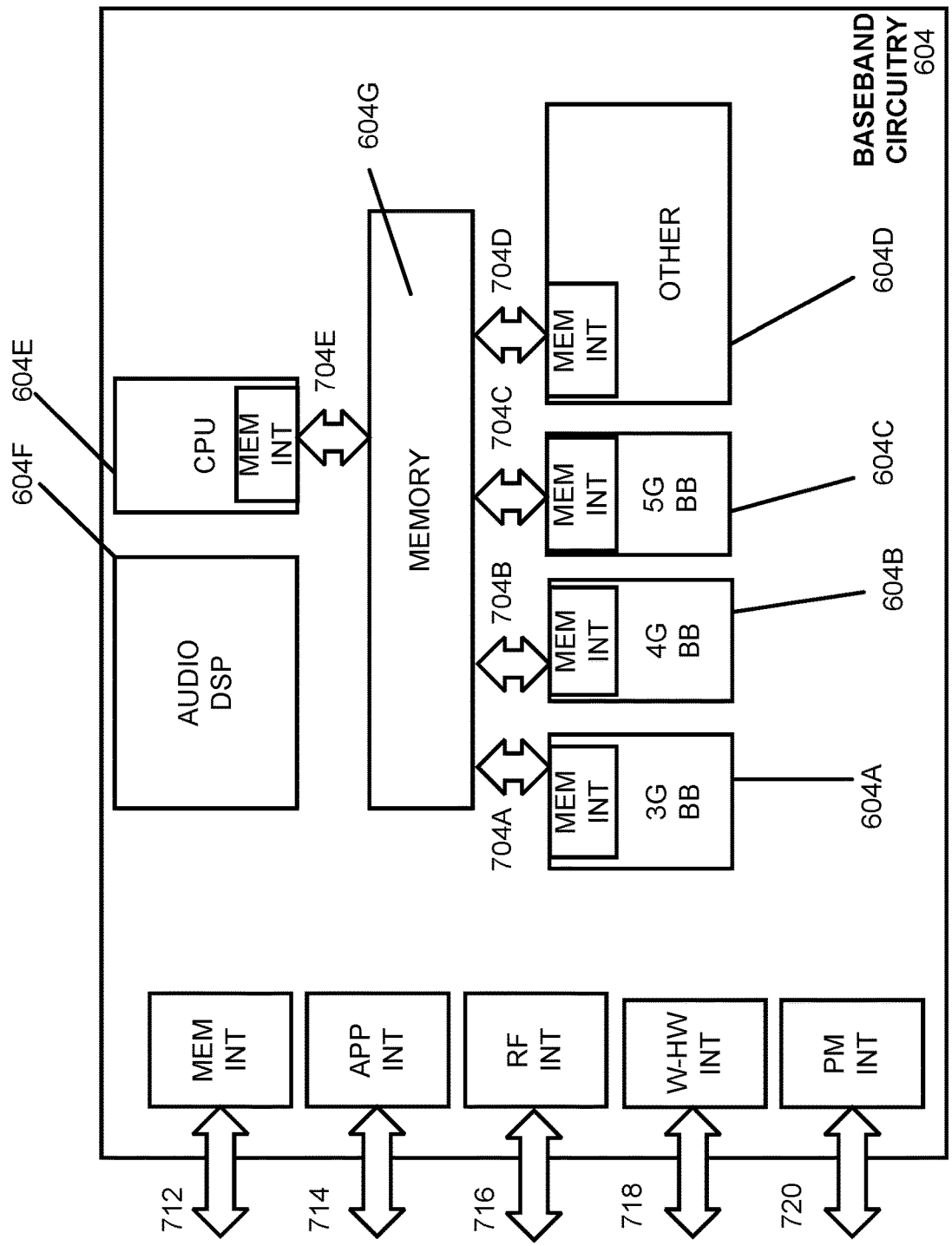
FIG. 7 illustrates example interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
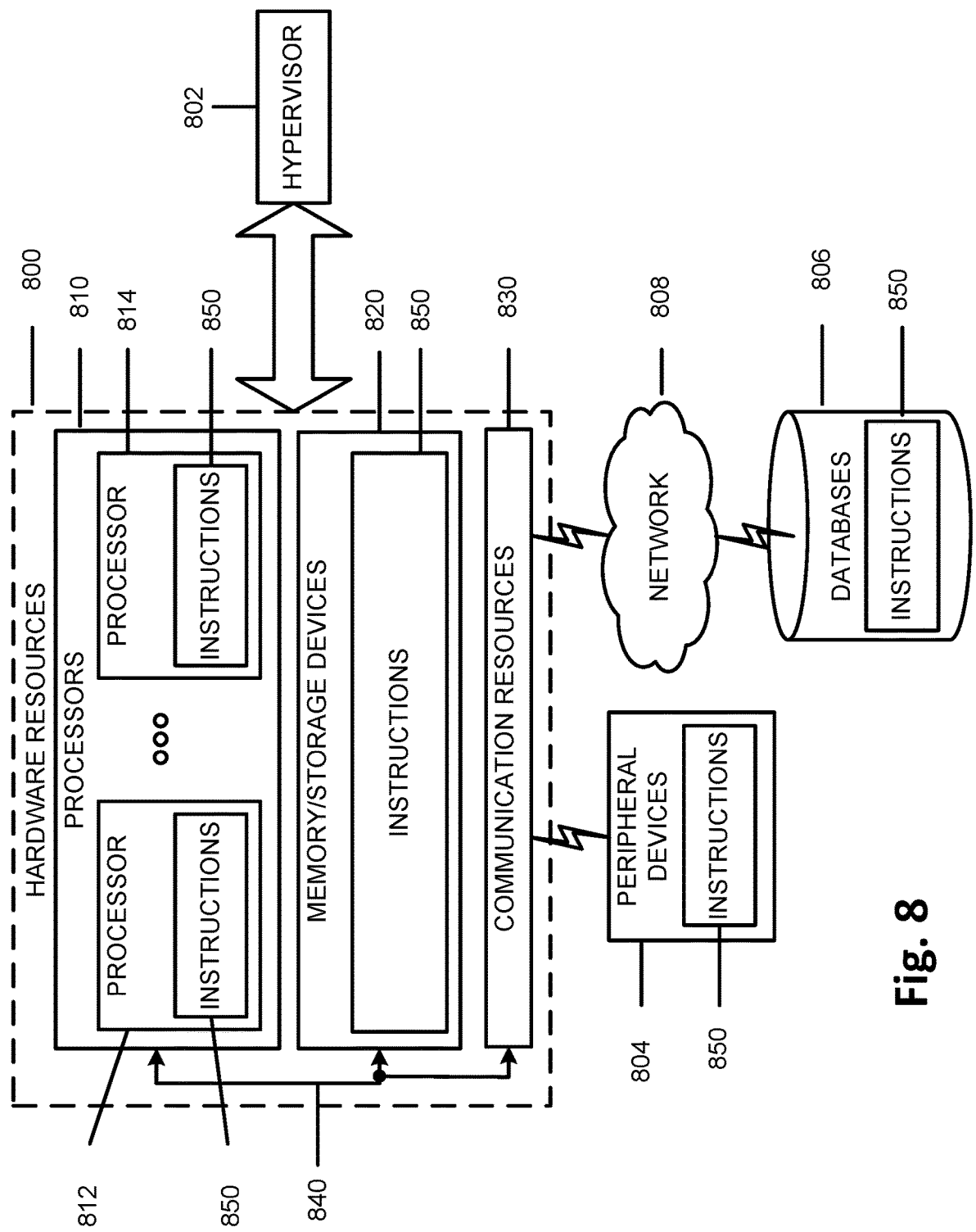
FIG. 8 is a block diagram illustrating components, according to some example embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

A number of examples, relating to implementations of the techniques described above, will next be given.

In a first example, a baseband apparatus for User Equipment (UE) comprises an interface to radio frequency (RF) circuitry; and one or more processors to: monitor a common search space (CSS) of a Machine-Type Communications (MTC) Physical Downlink Control Channel (MPDCCH) or Narrowband Physical Data Control Channel (NPDCCH) for the scheduling of a Physical Downlink Shared Channel (PDSCH) or a Narrowband Physical Downlink Shared Channel (NPDSCH), respectively, wherein the monitoring of the CSS includes: decoding a single downlink control information (DCI) transmission, wherein a cyclic redundancy check (CRC) portion of the DCI transmission is scrambled using a Single-Cell Radio Network Temporary Identifier (SC-RNTI) that includes scheduling information for a Single-Cell Multicast Control Channel (SC-MCCH) and wherein indications of changes in the SC-MCCH configuration are carried via one or more bits of the DCI; and receive, via the interface to RF circuitry and based on the decoded first and second DCI transmissions, the SC-MCCH.

In example 2, the subject matter of example, 1, wherein, when the UE is a Narrowband low complexity (BL) or coverage enhanced (CE) UE, and a format of the DCI corresponds to DCI format 6-2.

In a third example, a User Equipment (UE) apparatus may comprise a computer-readable medium containing processing instructions; and one or more processors, to execute the processing instructions to: transmit, to a Single-Cell Point-To-Multipoint (SC-PTM) base station, multicast service preference information, including at least one of a Coverage Enhancement (CE) mode or a maximum Transport Block Size (TBS) of the UE; and monitor a common search space (CSS) of a MTC Physical Downlink Control Channel (MPDCCH) or Narrowband Physical Data Control Channel (NPDCCH) for the scheduling of a Physical Downlink Shared Channel (PDSCH) or a Narrowband Physical Downlink Shared Channel (NPDSCH), respectively, to obtain downlink control information (DCI) that includes configuration information relating to a single-Cell Multicast Control Channel (SC-MCCH); and receive, based on the DCI, the SC-MCCH.

In example 4, the subject matter of example 3, or any of the preceding examples, wherein the monitoring of the common search space further includes: obtaining the DCI additionally based on a cyclic redundancy check (CRC) portion of the DCI being scrambled using a Single-Cell Radio Network Temporary Identifier (SC-RNTI) that includes scheduling information for the SC-MCCH and wherein indications of changes in the SC-MCCH configuration are carried via one or more bits of the DCI.

In example 5, the subject matter of examples 1 or 3, or any of the preceding examples, wherein, when the UE is a Narrowband Internet-of-Things (NB-IoT) UE, a format of the DCI corresponds to DCI format N2.

In example 6, the subject matter of examples 1 or 3, or any of the preceding examples, wherein the one or more processors are further to: support Type3-CSS using only distributed MPDCCH.

In example 7, the subject matter of examples 1 or 3, or any of the preceding examples, wherein, for the CSS of the MPDCCH, an aggregation level is 24 and includes a Physical Resource Block (PRB) with a set of 2+4, and, for the CSS of the NPDCCH, the aggregation level is 2.

In example 8, the subject matter of examples 1 or 3, or any of the preceding examples, wherein, the starting subframe for the CSS for MPDCCH or NPDCCH is indicated in one or more fields in a System Information Block (SIB) Type 20 (SIB20).

In example 9, the subject matter of examples 1 or 3, or any of the preceding examples, wherein, frequency hopping (FH) for the CSS for MPDCCH is configured via an information element indicated as part of System Information Block (SIB) signaling.

In example 10, the subject matter of examples 1 or 3, or any of the preceding examples, wherein a maximum number of repetitions of CSS signaling is indicated, in a cell specific manner, using System Information Block (SIB) signaling.

In example 11, the subject matter of examples 1 or 3, or any of the preceding examples, wherein, the one or more processors are further to: prioritize monitoring of Type3-CSS signaling over Type4-CSS signaling.

In example 12, the subject matter of examples 1 or 3, or any of the preceding examples, wherein, wherein the one or more processors are further to: transmit multicast service preference information that includes an indication of a maximum Transport Block Size (TBS) of the UE.

In example 13, the subject matter of examples 1 or 3, or any of the preceding examples, wherein, wherein the one or more processors are further to: prioritize MPDCCH or NPDCCH, relating to a random access procedure, over monitoring or reception of Single-Cell Point-To-Multipoint (SC-PTM) information.

In example 14, the subject matter of examples 1 or 3, or any of the preceding examples, wherein, wherein the one or more processors are further to: prioritize paging for DCI monitoring over reception of Single-Cell Point-To-Multipoint (SC-PTM) information.

In example 15, the subject matter of examples 1 or 3, or any of the preceding examples, wherein, wherein a starting subframe for MPDCCH or NPDCCH candidates, for all repetition levels (RLs), is aligned with a starting subframe of Type3-CSS.

In example 16, the subject matter of examples 1 or 3, or any of the preceding examples, wherein the one or more processors are further to: implement multi-carrier operation (MCO) transmissions for Type3-CSS and Single-Cell Point-To-Multipoint (SC-PTM) transmissions, in which all SC-PTM transmissions are transmitted using a same carrier.

In example 17 the subject matter of example 3, or any of the preceding examples, wherein, wherein the starting subframe for the CSS for MPDCCH or NPDCCH is indicated in one or more of the fields sc-mcch-FirstSubframe, sc-mcch-RepetitionPeriod, and sc-mcch-Offset in a System Information Block (SIB) Type 20 (SIB20).

In example 18, the subject matter of examples 1 or 3, or any of the preceding examples, wherein, frequency hopping (FH) for the CSS for MPDCCH is configured to be on or off via a single common parameter indicated as part of MTC-System Information Block (SIB) signaling.

In example 19, the subject matter of examples 1 or 3, or any of the preceding examples, wherein the one or more processors are further to: monitor a Type4-CSS for MPDCCH or NPDCCH, for scheduling of the PDSCH or NPDSCH, respectively, for carrying SC-MTCH information.

In a 20$^{th}$ example, computer-readable medium contains program instructions for causing one or more processors, of User Equipment (UE), to: monitor a common search space (CSS) of a Machine-Type Communications (MTC) Physical Downlink Control Channel (MPDCCH) or Narrowband Physical Data Control Channel (NPDCCH) for the scheduling of a Physical Downlink Shared Channel (PDSCH) or a Narrowband Physical Downlink Shared Channel (NPDSCH), respectively, wherein the monitoring of the CSS includes: decoding a single downlink control information (DCI) transmission, wherein a cyclic redundancy check (CRC) portion of the DCI transmission is scrambled using a Single-Cell Radio Network Temporary Identifier (SC-RNTI) that includes scheduling information for a Single-Cell Multicast Control Channel (SC-MCCH) and wherein indications of changes in the SC-MCCH configuration are carried via one or more bits of the DCI; and receive, based on the decoded first and second DCI transmissions, the SC-MCCH.

In example 21, the subject matter of examples 20, or any of the preceding examples, wherein, wherein the monitoring of the common search space further includes: obtaining the DCI additionally based on a cyclic redundancy check (CRC) portion of the DCI being scrambled using a Single-Cell Radio Network Temporary Identifier (SC-RNTI) that includes scheduling information for the SC-MCCH and wherein indications of changes in the SC-MCCH configuration are carried via one or more bits of the DCI.

In example 22, the subject matter of example 20, or any of the preceding examples, wherein, when the UE is a Narrowband Internet-of-Things (NB-IoT) UE, a format of the DCI corresponds to DCI format N2.

In example 23, the subject matter of example 20, or any of the preceding examples, wherein, wherein the one or more processors are further to: support Type3-CSS using only distributed MPDCCH.

In example 24, the subject matter of examples 20, or any of the preceding examples, wherein, wherein, for the CSS of the MPDCCH, an aggregation level is 24 and includes a Physical Resource Block (PRB) with a set of 2+4, and, for the CSS of the NPDCCH, the aggregation level is 2.

In example 25, the subject matter of example 20, or any of the preceding examples, wherein, wherein the starting subframe for the CSS for MPDCCH or NPDCCH is indicated in one or more fields in a System Information Block (SIB) Type 20 (SIB20).

In example 26, the subject matter of example 20, or any of the preceding examples, wherein, wherein frequency hopping (FH) for the CSS for MPDCCH is configured via an information element indicated as part of System Information Block (SIB) signaling.

In example 27, the subject matter of example 20, or any of the preceding examples, wherein, wherein a maximum number of repetitions of CSS signaling is indicated, in a cell specific manner, using System Information Block (SIB) signaling.

In example 28, the subject matter of example 20, or any of the preceding examples, wherein, wherein the one or more processors are further to: prioritize monitoring of Type3-CSS signaling over Type4-CSS signaling.

In example 29, the subject matter of example 20, or any of the preceding examples, wherein the one or more processors are further to: transmit multicast service preference information that includes an indication of a maximum Transport Block Size (TBS) of the UE.

In example 30, the subject matter of example 20, or any of the preceding examples, wherein, the one or more processors are further to: prioritize MPDCCH or NPDCCH, relating to a random access procedure, over monitoring or reception of Single-Cell Point-To-Multipoint (SC-PTM) information.

In example 31, the subject matter of example 20, or any of the preceding examples, wherein the one or more processors are further to: prioritize paging for DCI monitoring over reception of Single-Cell Point-To-Multipoint (SC-PTM) information.

In example 32, the subject matter of example 20, or any of the preceding examples, wherein a starting subframe for MPDCCH or NPDCCH candidates, for all repetition levels (RLs), is aligned with a starting subframe of Type3-CSS.

In example 33, the subject matter of example 20, or any of the preceding examples, wherein the one or more processors are further to: implement multi-carrier operation (MCO) transmissions for Type3-CSS and Single-Cell Point-To-Multipoint (SC-PTM) transmissions, in which all SC-PTM transmissions are transmitted using a same carrier.

In example 34, the subject matter of example 20, or any of the preceding examples, wherein the starting subframe for the CSS for MPDCCH or NPDCCH is indicated in one or more of the fields sc-mcch-FirstSubframe, sc-mcch-RepetitionPeriod, and sc-mcch-Offset in a System Information Block (SIB) Type 20 (SIB20).

In example 35, the subject matter of example 20, or any of the preceding examples, wherein frequency hopping (FH) for the CSS for MPDCCH is configured to be on or off via a single common parameter indicated as part of MTC-System Information Block (SIB) signaling.

In example 36, the subject matter of example 20, or any of the preceding examples, wherein the one or more processors are further to: monitor a Type4-CSS for MPDCCH or NPDCCH, for scheduling of the PDSCH or NPDSCH, respectively, for carrying SC-MTCH information.

In a 37$^{th}$ example, a method, performed by User Equipment (UE), comprises monitoring a common search space (CSS) of a Machine-Type Communications (MTC) Physical Downlink Control Channel (MPDCCH) or Narrowband Physical Data Control Channel (NPDCCH) for the scheduling of a Physical Downlink Shared Channel (PDSCH) or a Narrowband Physical Downlink Shared Channel (NPDSCH), respectively, wherein the monitoring of the CSS includes: decoding a single downlink control information (DCI) transmission, wherein a cyclic redundancy check (CRC) portion of the DCI transmission is scrambled using a Single-Cell Radio Network Temporary Identifier (SC-RNTI) that includes scheduling information for a Single-Cell Multicast Control Channel (SC-MCCH) and wherein indications of changes in the SC-MCCH configuration are carried via one or more bits of the DCI; and receiving, based on the decoded first and second DCI transmissions, the SC-MCCH.

In example 38, the subject matter of example 31, or any of the preceding examples, wherein when the UE is a Narrowband low complexity (BL) or coverage enhanced (CE) UE, a format of the DCI corresponds to DCI format 6-2.

In a 39$^{th}$ example, User Equipment (UE) may comprising: means for monitoring a common search space (CSS) of a Machine-Type Communications (MTC) Physical Downlink Control Channel (MPDCCH) or Narrowband Physical Data Control Channel (NPDCCH) for the scheduling of a Physical Downlink Shared Channel (PDSCH) or a Narrowband Physical Downlink Shared Channel (NPDSCH), respectively, wherein the monitoring of the CSS includes: decoding a single downlink control information (DCI) transmission, wherein a cyclic redundancy check (CRC) portion of the DCI transmission is scrambled using a Single-Cell Radio Network Temporary Identifier (SC-RNTI) that includes scheduling information for a Single-Cell Multicast Control Channel (SC-MCCH) and wherein indications of changes in the SC-MCCH configuration are carried via one or more bits of the DCI; and means for receiving, based on the decoded first and second DCI transmissions, the SC-MCCH.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 3 and 4, the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:
1. User Equipment (UE), comprising:
an interface to radio frequency (RF) circuitry; and
one or more processors to:
    monitor a common search space (CSS) of a Machine-Type Communications (MTC) Physical Downlink Control Channel (MPDCCH) or Narrowband Physical Data Control Channel (NPDCCH) for the scheduling of a Physical Downlink Shared Channel (PDSCH) or a Narrowband Physical Downlink Shared Channel (NPDSCH), respectively, wherein the monitoring of the CSS includes:
        decoding a single downlink control information (DCI) transmission, wherein a cyclic redundancy check (CRC) portion of the DCI transmission is scrambled using a Single-Cell Radio Network Temporary Identifier (SC-RNTI), wherein the

DCI includes scheduling information for a Single-Cell Multicast Control Channel (SC-MCCH), and wherein indications of changes in a configuration of the SC-MCCH are carried via one or more bits of the DCI; and receive, via the interface to RF circuitry and based on the decoded DCI transmission, the SC-MCCH.

2. The UE of claim 1, wherein, when the UE is a Narrowband low complexity (BL) or coverage enhanced (CE) UE, and a format of the DCI corresponds to DCI format 6-2.

3. The UE of claim 1, wherein the monitoring of the common search space further includes:

obtaining the DCI based on the cyclic redundancy check (CRC) portion of the DCI that is scrambled using the Single-Cell Radio Network Temporary Identifier (SC-RNTI).

4. The UE of claim 1, wherein, when the UE is a Narrowband Internet-of-Things (NB-IoT) UE, a format of the DCI corresponds to DCI format N2.

5. The UE of claim 1, wherein the one or more processors are further to:

support Type3-CSS using only distributed MPDCCH.

6. The UE of claim 1, wherein, for the CSS of the MPDCCH, an aggregation level is 24 and includes a Physical Resource Block (PRB) with a set of 2+4, and, for the CSS of the NPDCCH, the aggregation level is 2.

7. The UE of claim 1, wherein the starting subframe for the CSS for MPDCCH or NPDCCH is indicated in one or more fields in a System Information Block (SIB) Type 20 (SIB20).

8. The UE of claim 1, wherein frequency hopping (FH) for the CSS for MPDCCH is configured via an information element indicated as part of System Information Block (SIB) signaling.

9. A non-transitory computer-readable medium containing program instructions for causing one or more processors, of User Equipment (UE), to:

monitor a common search space (CSS) of a Machine-Type Communications (MTC) Physical Downlink Control Channel (MPDCCH) or Narrowband Physical Data Control Channel (NPDCCH) for the scheduling of a Physical Downlink Shared Channel (PDSCH) or a Narrowband Physical Downlink Shared Channel (NPDSCH), respectively, wherein the monitoring of the CSS includes:

decoding a single downlink control information (DCI) transmission, wherein a cyclic redundancy check (CRC) portion of the DCI transmission is scrambled using a Single-Cell Radio Network Temporary Identifier (SC-RNTI), wherein the DCI includes scheduling information for a Single-Cell Multicast Control Channel (SC-MCCH), and wherein indications of changes in a configuration of the SC-MCCH are carried via one or more bits of the DCI; and receive, based on the decoded DCI transmission, the SC-MCCH.

10. The non-transitory computer-readable medium of claim 9, wherein the monitoring of the common search space further includes:

obtaining the DCI based on the cyclic redundancy check (CRC) portion of the DCI that is scrambled using the Single-Cell Radio Network Temporary Identifier (SC-RNTI).

11. The non-transitory computer-readable medium of claim 9, wherein, when the UE is a Narrowband Internet-of-Things (NB-IoT) UE, a format of the DCI corresponds to DCI format N2.

12. A baseband apparatus for User Equipment (UE), comprising:

an interface to radio frequency (RF) circuitry; and
one or more processors to:

monitor a common search space (CSS) of a Machine-Type Communications (MTC) Physical Downlink Control Channel (MPDCCH) or Narrowband Physical Data Control Channel (NPDCCH) for a first downlink control information (DCI) transmission that indicates when a Single-Cell Multicast Control Channel (SC-MCCH) is scheduled;

monitor the CSS of the MPDCCH or NPDCCH for a second DCI transmission that indicates notifications relating to SC-MCCH content;

decoding the first DCI transmission and the second DCI transmission to ascertain the scheduling information of the SC-MCCH and to determine notifications relating to the SC-MCCH content, respectively; and receive, via the interface to RF circuitry and based on the decoded first and second DCI transmissions, the SC-MCCH.

13. The apparatus of claim 12, wherein the first DCI transmission comprises a cyclic redundancy check (CRC) portion that is scrambled using a Single-Cell Radio Network Temporary Identifier (SC-RNTI) that includes scheduling information for a Single-Cell Multicast Control Channel (SC-MCCH).

14. The apparatus of claim 13, wherein indications of changes in the SC-MCCH configuration are carried via one or more bits of the first DCI.

15. The apparatus of claim 13, wherein the second DCI transmission comprises a CRC portion that is scrambled.

16. The apparatus of claim 15, wherein the scrambling of the second DCI is different than the scrambling of the first DCI.

17. The apparatus of claim 12, wherein the one or more processors are configured to concurrently monitor the CSS of the MPDCCH or NPDCCH for the first DCI and monitor the CSS of the MPDCCH or NPDCCH for the second DCI transmission.

18. A user equipment (UE) device, comprising a processor configured to perform operations comprising:

monitoring a common search space (CSS) of a Machine-Type Communications (MTC) Physical Downlink Control Channel (MPDCCH) or Narrowband Physical Data Control Channel (NPDCCH) for the scheduling of a Physical Downlink Shared Channel (PDSCH) or a Narrowband Physical Downlink Shared Channel (NPDSCH), respectively, wherein the monitoring of the CSS includes:

decoding a single downlink control information (DCI) transmission, wherein a cyclic redundancy check (CRC) portion of the DCI transmission is scrambled using a Single-Cell Radio Network Temporary Identifier (SC-RNTI), wherein the DCI includes scheduling information for a Single-Cell Multicast Control Channel (SC-MCCH), and wherein indications of changes in a configuration of the SC-MCCH are carried via one or more bits of the DCI; and receive, via the interface to RF circuitry and based on the decoded DCI transmission, the SC-MCCH.

19. The UE device of claim 18, wherein, when the UE is a Narrowband low complexity (BL) or coverage enhanced (CE) UE, and a format of the DCI corresponds to DCI format 6-2.

20. The UE device of claim 18, wherein the monitoring of the common search space further includes:
   obtaining the DCI based on the cyclic redundancy check (CRC) portion of the DCI that is scrambled using the Single-Cell Radio Network Temporary Identifier (SC-RNTI).

21. The UE device of claim 18, wherein, when the UE is a Narrowband Internet-of-Things (NB-IoT) UE, a format of the DCI corresponds to DCI format N2.

22. The UE device of claim 18, wherein the one or more processors are further to:
   support Type3-CSS using only distributed MPDCCH.

23. The UE device of claim 18, wherein, for the CSS of the MPDCCH, an aggregation level is 24 and includes a Physical Resource Block (PRB) with a set of 2+4, and, for the CSS of the NPDCCH, the aggregation level is 2.

24. The UE device of claim 18, wherein the starting subframe for the CSS for MPDCCH or NPDCCH is indicated in one or more fields in a System Information Block (SIB) Type 20 (SIB20).

25. The UE device of claim 18, wherein frequency hopping (FH) for the CSS for MPDCCH is configured via an information element indicated as part of System Information Block (SIB) signaling.

* * * * *

UNITED STATES PATENT AND TRADEMARK OFFICE
CERTIFICATE OF CORRECTION

PATENT NO. : 11,159,928 B2
APPLICATION NO. : 16/316771
DATED : October 26, 2021
INVENTOR(S) : Chatterjee et al.

It is certified that error appears in the above-identified patent and that said Letters Patent is hereby corrected as shown below:

In the Claims

In Column 24, Line 58: Replace the word "Data" with Downlink

In Column 24, Line 65: Insert the word --single-- between "the" and "DCI"

In Column 24, Line 67: Replace the word "the" with a

In Column 25, Line 7: Replace the word "decoded" with single

In Column 25, Line 29: Replace the word "the" with a

In Column 25, Line 44: Replace the word "Data" with Downlink

In Column 25, Line 51: Insert the word --single-- between "the" and "DCI"

In Column 25, Line 53: Replace the word "the" with a

In Column 25, Line 59: Replace the word "decoded" with single

In Column 26, Line 13: Replace the word "Data" with Downlink

In Column 26, Line 25: Remove the word "decoded"

In Column 26, Line 25: Insert --DCI transmission-- between the word "first" and "and"

In Column 26, Line 25: Insert --the-- between the words "and" and "second"

In Column 26, Line 25: replace the word "transmissions" with transmission

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,159,928 B2

In Column 26, Line 35: Insert --configuration of the-- between the words "the" and "SC-MCCH"

In Column 26, Line 35: Remove the word "configuration" after "SC-MCCH"

In Column 26, Line 39: Replace the second instance of "the" with a

In Column 26, Line 40: Insert --transmission-- after "DCI"

In Column 26, Line 41: Insert --transmission-- after "DCI"

In Column 26, Line 44: Insert --transmission-- after "DCI"

In Column 26, Line 52: Replace the word "Data" with Downlink

In Column 26, Line 61: Replace the word "the" with a

In Column 26, Line 67: Replace the word "decoded" with single

In Column 27, Line 21: Replace the second instance of "the" with a